May 16, 1939.   M. BONOTTO   2,158,782
APPARATUS FOR FEEDING COUNTERCURRENT EXTRACTION UNITS
Filed Dec. 9, 1937
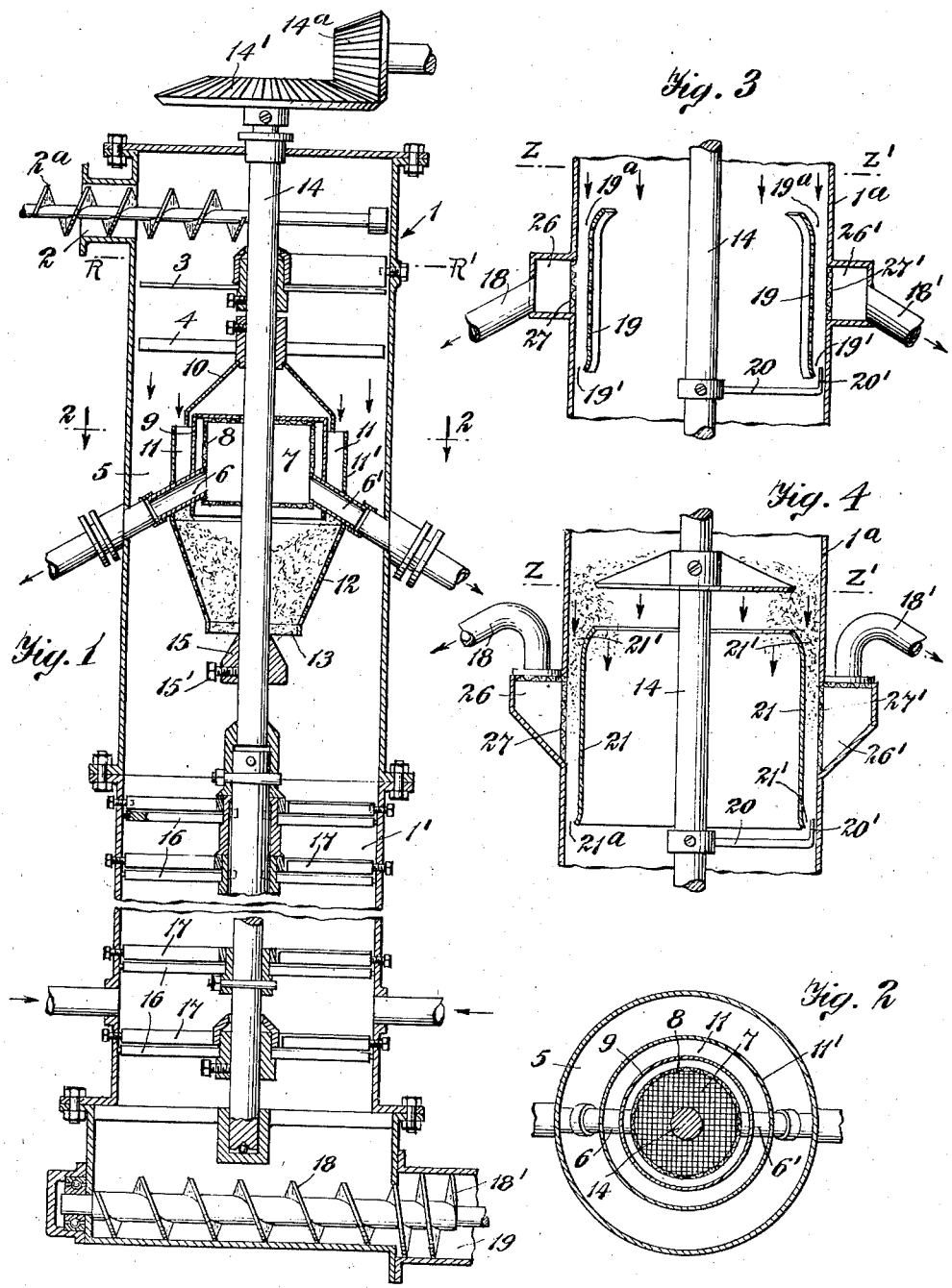
INVENTOR.
Michele Bonotto
BY Joseph F. O'Brien
ATTORNEY.

Patented May 16, 1939

2,158,782

UNITED STATES PATENT OFFICE 2,158,782

APPARATUS FOR FEEDING COUNTER-CURRENT EXTRACTION UNITS

Michele Bonotto, Evansville, Ind., assignor to Extractol Process, Ltd., Wilmington, Del., a corporation of Delaware Application December 9, 1937, Serial No. 178,835

4 Claims. (Cl. 87—6)

This invention relates to apparatus for feeding counter-current extraction units, and particularly to apparatus for feeding raw solid material through miscella outlets in such units.

In conventional extraction units of the counter-current type, solid raw material is fed through one end of a tank, solvent is fed through the opposite end, and a screen-covered miscella outlet is positioned in a zone or section adjacent to the feed mechanism for the solid raw material, and the raw solid material is thus caused to pass through a zone in which such screen-protected outlet or outlets for the miscella is located. The raw material is often fed past said miscella outlet or outlets at a relatively rapid rate of speed according to the various characteristics of the extractors and in such passage, certain fines in the raw solid material form, with the outgoing miscella, a cloud which passes directly through the protecting screen of the miscella outlet and into the outlet conduit, thus causing such fines to by-pass the extraction portion of the unit or if the protecting screen is of very fine mesh such fines will have a tendency to clog it. Obviously, the oil from such fines will not be fully extracted and such unexhausted fines constitute an undesirable constituent of the miscella which causes difficulty and trouble to remove. It will be understood that if the packing condition of the material passing through the section having the miscella outlets is constant, the quantity of such fines so formed will be in proportion to the speed of the raw material flowing through said section having the miscella outlets.

One of the objects of applicant's invention is to enable passage of such raw solid material through a section having miscella outlets at any suitable speed while greatly reducing and minimizing the amount or quantity of fine particles suspended in the miscella which will be formed into clouds at or adjacent to the miscella outlet and carried forward or through the protecting screen.

Another feature of my invention comprises the utilization, in a continuous extraction system, of a part of the raw material being fed to provide a continuously-renewed filter bed between the miscella outlet and the body of miscella so that fines carried by said miscella will be filtered out before discharge thereof. I separate or divide the feed-channel through the section having the miscella-outlets into two parts, one comprising a normal feed channel for fast-moving raw material and the other a feed-retarding channel or chamber surrounding the screened outlets, in the latter of which I separate from the main body a relatively small quantity of the raw material which is being passed through the said section having the outlets in the extraction unit and retard, by suitable means, the movement of such separated relatively small quantity to greatly reduce the feeding-movement thereof through the said section having the miscella outlets and to provide a slow-moving bed of such raw material adjacent to such outlets, and I am thus enabled to greatly reduce and minimize the formation of clouds of fines at or adjacent to said miscella outlet or outlets.

My invention, therefore, contemplates the provision, at or adjacent to and surrounding the conventional screened miscella outlet or outlets, of means for enclosing a space or channel which is relatively small in relation to the area of the feed channel through the section naving the outlets of the extraction unit, the deflection of a small portion of the material being fed into this enclosed space and the provision of a restricted outlet for this channel to cause retardation through said enclosed space of the movement of said relatively small portion of material and the provision, surrounding the miscella outlets, of a slow-moving mass which will avoid formation of clouds of fines and will serve as a filter bed between the body of miscella and said outlet or outlets so as to filter out fines that would normally be carried by said miscella through said outlets.

Another feature of my invention includes the provision of stirring means movable through the aforesaid restricted outlet to insure the passage of the raw material therethrough at a retarded rate of speed, and to provide for the renewal of the filter bed hereinabove referred to.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawing, in which:

Fig. 1 is a vertical section of an extraction unit embodying my invention;

Fig. 2 is a section on the line 2—2 of Fig. 1, looking in the direction of the arrows;

Fig. 3 is a fragmentary view in vertical section of another modified form of my invention, and Fig. 4 is another fragmentary view in vertical section of another form of my invention.

Referring now to the drawing and particularly to Figs. 1 and 2 which illustrate a preferred embodiment of my invention, I indicates an extraction unit comprising, as shown, a cylindrical tank having, at its upper end, a feed-inlet 2 for solid material which, as illustrated, is fed into the tank by screw 2ª which feeds material from any suitable source, not shown, to the interior of the tank I after which such solid material falls down upon a conventional distributing plate 3, and is then passed through a conventional plural-armed spreader 4, after which the solid material passes downwardly into and through what I shall term "the miscella-outlet section" 5, which may be defined as that part of the extraction unit which is adjacent to the miscella outlet or outlets and which is conventionally and desirably located between the feed mechanism and the extraction zone I'. In the form of unit shown, the extraction zone I' is composed of a suitable number of superposed extraction compartments or chambers.

Leading from miscella-outlet section 5, in the form of unit shown, are miscella outlet conduits 6, 6'. These outlet conduits 6, 6', in the said embodiment shown, extend from a screened chamber 7 within which the miscella is collected to a suitable miscella tank, not shown. The miscella is thereafter subjected to suitable operations to separate the oil from the solvent and also from impurities, but such operations form no part of my present invention.

In accordance with the preferred embodiment of my invention illustrated in Figs. 1 and 2, the solid material normally passes through the outlet section 5 at a relatively high rate of speed, approximating three quarters of a foot per minute, and heretofore during the passage of such solid material through the liquid miscella in such section, the fines in such solid material would form with such extracted liquid miscella as it passed upwardly in the unit, clouds comprising miscella mixed with such fines. Such clouds would thereafter, without passing through the extraction part of the unit, pass directly out through the miscella outlets. It will be obvious that when solid material of certain types, as for example, distillers spent grain or flaked flax seed, is passed through the miscella-outlet section at a relatively high rate of speed, a proportionately large quantity of such clouds will be produced in said section adjacent to said outlets and such clouds so formed will be passed through the screens directly into the miscella-outlet conduit or conduits, clouding and adding a solid impurity to the miscella in the miscella reservoir or tank, and making an additional operation or operations necessary to remove the fine particles from the miscella after the same is passed into such miscella reservoir, or if the protecting screen is of very fine mesh such fines will have a tendency to clog it.

In accordance with my invention, I provide, within the section 5 adjacent to the miscella-outlet or outlets, a shallow chamber or compartment or confined annular space of relatively small area adapted to receive a relatively small portion of the solid material being fed through said miscella outlet section, and I provide said compartment with a restricted outlet and with a suitable inlet so positioned as to guide, through this compartment, a relatively small proportionate quantity of the solid material passing through said section 5. I am thus enabled to procure a retardation of the material passing through this compartment or chamber which, as aforesaid, is adjacent to or surrounds the miscella outlet or outlets.

In the form of my invention shown in Figs. 1 and 2, the miscella outlet conduits 6, 6' extend within and drain miscella from a central compartment or chamber 7 which is formed by an annular screen 8. The screen 8 is preferably protected by a surrounding sheet-metal housing 9 having walls of annular configuration, and a material-deflecting top 10 of conical form which deflects material to the outside of the housing 9.

In accordance with my invention, a relatively small part of the material being fed is, at a level above the miscella outlets, caused to pass through a confined annular space compartment or chamber 11 and through a restricted outlet 13 so that the movement of material entering and passing through this chamber 11 will be greatly retarded and I find that it will be possible, in an apparatus of the type specified, to so retard the passage through this confined chamber as to reduce speed of the material from approximately three quarters of a foot per minute to approximately three feet per hour. In this way I form, in the confined chamber or compartment 11, a relatively small body of solid material which will be moving slowly when it approaches and reaches the miscella level and the miscella will be compelled to pass through this small body of material in order to reach the outlets. This slow-moving body of material will thus form a buffer between the outlets and the stream of fast-moving solid material surrounding the same and will function as a filter for the miscella and a shield against the formation of clouds adjacent to the outlets. This body of solid material which, as aforesaid, is moving at a very slow rate of speed will greatly reduce, if not entirely eliminate the formation of clouds of miscella adjacent to the outlets thus avoiding the direct passage of such clouds into and through the miscella outlets, and will furthermore filter out, from the miscella, fines that may be formed into clouds outside the said compartment or chamber or that may be carried by the miscella from the extraction part of the apparatus.

In accordance with the preferred form of my invention, I form the chamber 11 by providing above the liquid level outside of and spaced a short distance from the housing 9, an annular vertical-partition member 11' connected at its lower end with a conical member 12 extending below the liquid level and having a restricted outlet 13.

In the said preferred embodiment of my invention illustrated, the unit I is provided with an axial shaft 14 which is rotated by gears 14', 14ª from any suitable source of power not shown, and in said preferred form of this invention, I mount on the shaft 14, a conical stirrer 15 which, as shown, is fixed to the shaft by bolt 15'. The upper end of the stirrer 15 extends into or adjacent to the outlet 13 so as to stir the material passing through such outlet and assist in evacuating the same. By moving the conical stirrer 15 up or down I am enabled to increase or decrease the area of the outlet 13 and thus to regulate the speed of the material through the outlet 13.

A unit of the type under consideration also is preferably provided, below the miscella outlet section, with a series of extraction chambers or zones the specific construction of which forms no part of my present invention. As illustrated, the extraction portion of the unit, as shown in Fig. 1, has a series of superposed compartments separated from each other by partition plates 16 having suitable material-passing openings and provided with suitable damming elements 17. The bottom end of the preferred form of my unit is provided with a solvent inlet or feed adapted to pass solvent upwardly, while the feed of solid material is being moved downwardly. The unit illustrated in Figs. 1 and 2 is preferably kept full of the material to be extracted up to the line R, R' and in this case the conical member 12 may be perforated, as shown. At the bottom of the tank, solid material is passed to one or more discharge screws 18, 18' which form such material into an impermeable plug in a discharge conduit 19, only a fragment of which is shown.

In Fig. 3 I have shown a modified form of my invention applied to a different form of apparatus. In this apparatus, instead of the axially disposed miscella-outlet chamber 7, outlets 26, 26' are positioned at the outer perimeter of the tank and are normally protected by screens 27, 27' leading to conduits 18, 18'. In accordance with my invention, I provide in the miscella-outlet section adjacent to the outlet or outlets, segmental material-diverting plates or vertical partition 19 provided at their tops with material inlets 19ᵃ at their lower ends with restricted outlets 19', 19', and in this form of my invention I preferably utilize a stirrer arm 20 having a vertically-extending end 20' which preferably extends through the restricted opening of the shallow compartments formed between the plates 19 and the material wall 1ᵃ of the tank, and acts to stir the material and prevent undue clogging.

In Fig. 4, I have shown another modified form of my invention which is in all respects similar to Fig. 3, except that in this apparatus miscella-outlet chambers are of different shape and have miscella outlets connected at the top thereof. and I apply to this apparatus a vertical-partition or diverting wall 21 which is annular in conformation and extends completely around the internal wall instead of being segmental as shown in Fig. 3. This annular material-diverting wall forms a shallow chamber and has an inlet 21' and a restricted outlet 21ᵃ.

In Figs. 3 and 4 if the operation of the extractor requires that the tank be kept full of raw material up to the line Z—Z', then the vertical material-diverting and chamber-forming plates will preferably be perforated, as illustrated in Fig. 3, while if the operation of the extraction unit does not require that it be kept full of material up to the line Z—Z', then the cylindrical sectional wall 21 may be made imperforate as illustrated in Fig. 4.

Having described my invention, I claim:

1. Apparatus for feeding counter-current extraction units embodying an extraction tank having an extraction zone, a feed inlet for solid material at one end, a supply inlet for solvent at the opposite end and a miscella-outlet between the extraction zone and the feed inlet, a material-diverting wall forming a chamber surrounding said miscella-outlet, and means connected with said chamber for retarding the speed of material passing therethrough.

2. Apparatus for feeding counter-current extraction units embodying an extraction tank having an extraction zone, a feed inlet for solid material at one end, a supply inlet for solvent at the opposite end and a miscella-outlet between the extraction zone and the feed inlet, a material-diverting wall forming a chamber surrounding said miscella-outlet, said chamber having a restricted outlet to cause material passing therethrough to be retarded in movement and to form a filter bed surrounding said miscella-outlet.

3. Apparatus for feeding counter-current extraction units embodying an extraction tank having an extraction zone, a feed inlet for solid material at one end, a supply inlet for solvent at the opposite end and a miscella-outlet between the extraction zone and the feed inlet, a vertically-extending material-diverting wall forming a chamber surrounding said miscella-outlet, said chamber having a restricted outlet to cause material passing therethrough to be retarded in movement and to form a filter bed surrounding said miscella-outlet, and means at said restricted outlet for controlling the movement of material therethrough.

4. Apparatus for feeding counter-current extraction units embodying an extraction tank having an extraction zone, a feed inlet for solid material at one end, a supply inlet for solvent at the opposite end and an axially-disposed miscella-outlet between the extraction zone and the feed inlet, a vertically-extending material-diverting wall forming a chamber surrounding said miscella-outlets, said chamber having a restricted outlet to cause material passing therethrough to be retarded in movement and to form a filter bed surrounding said miscella-outlet, an axial shaft and an adjustable conical valve member mounted on said shaft at said restricted outlet for controlling the movement of material therethrough.

MICHELE BONOTTO.